W. W. BOWMAN.
DEMOUNTABLE RIM.
APPLICATION FILED JUNE 9, 1917.
1,345,313.
Patented June 29, 1920.
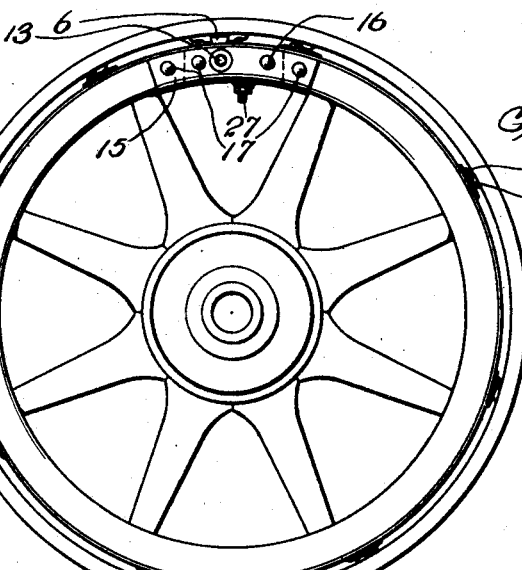
Fig. 1.
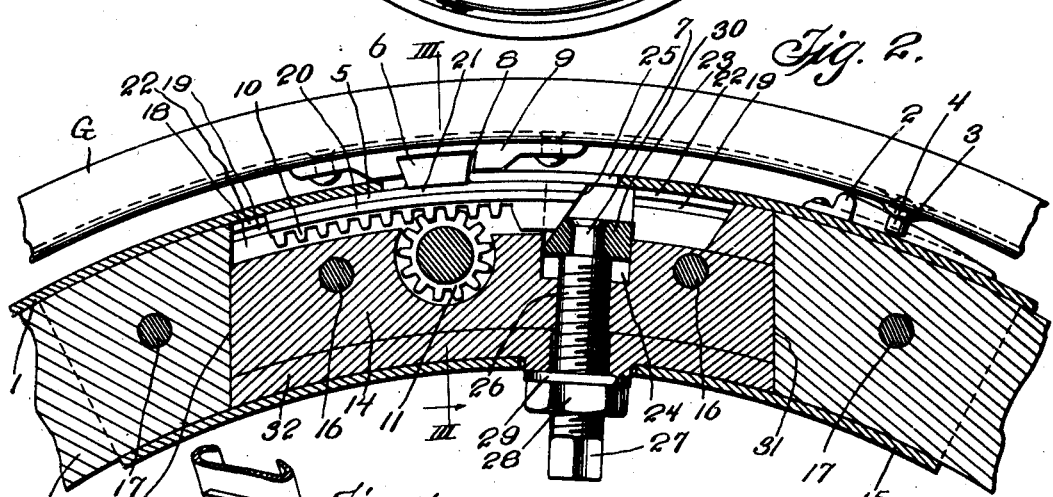
Fig. 2.
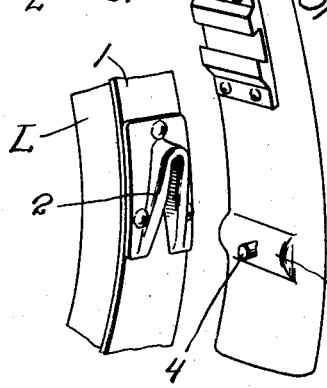
Fig. 4.
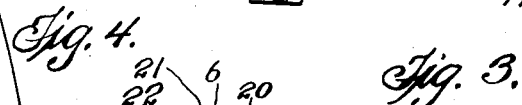
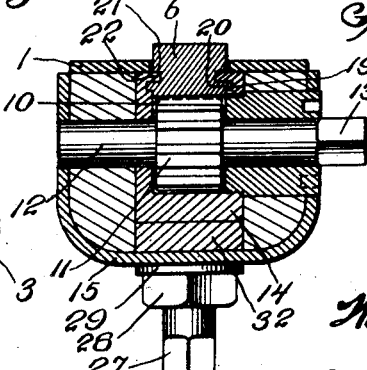
Fig. 3.
Fig. 5.
INVENTOR
Wade W. Bowman
BY
L. Burford Hands
ATTORNEY

UNITED STATES PATENT OFFICE.

WADE W. BOWMAN, OF NEW YORK, N. Y.

DEMOUNTABLE RIM.

1,345,313.  Specification of Letters Patent.  Patented June 29, 1920.

Application filed June 9, 1917. Serial No. 173,726.

*To all whom it may concern:*

Be it known that I, WADE W. BOWMAN, residing at New York, in the county of New York and State of New York, have invented certain new and useful Improvements in Demountable Rims, of which the following is a specification.

This invention relates to a demountable rim particularly adapted for use in connection with automobile and like wheels.

The object of the invention is to provide a simple but highly efficient means whereby the removable rim may be easily connected to or removed from the fixed rim of the wheel.

A further object is to provide a device which may be incorporated into wheel structures now in common use, that is a device which will not require a specially built wheel to carry it.

A more detailed object is to provide a device by means of which the removable rim may be moved into or out of its fixed position without necessity for manipulating the multiplicity of clamp nuts or other like parts, and which when in its final position will be held immovable irrespective of wear or inaccuracies of manufacture.

A further object is to provide new and improved wedge acting parts between the fixed and movable rims adapted for at once centering and tightening the rims with respect to each other, and having parts of such relative shape as to prevent likelihood of sticking by rust or the like.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Figure 1 is a side elevational view of a wheel constructed in accordance with this invention.

Fig. 2 is an enlarged fragmentary view of a portion of the wheel of Fig. 1, the view being shown in section for disclosing the structural arrangement, Fig. 3 is a transverse sectional view taken upon the plane of line III of Fig. 2, Fig. 4 is a fragmentary perspective view showing coöperative parts of the fixed and movable rims, and Fig. 5 is a diagrammatic view illustrating a modification.

Referring to the drawings for describing in detail the structure which is illustrated therein, the reference character L indicates the fixed rim of the wheel having the fixed metal band 1 thereon as is customary to automobile wheel construction. The band 1 however in the present invention is preferably flat in cross section, that is it is made without the outwardly curving marginal flange at one edge as usually employed.

The reference character G indicates the removable rim. This may be of any construction but usually is the same as is in common use for retaining the pneumatic tire.

At spaced points around the outer circumferential surface of the band 1 said band is provided with a series of cam plates 2 all inclining in the same circumferential direction. These may be separately formed and attached to the band 1 or they may be made as integral parts thereof, according to preference.

At similarly spaced points around the interior surface of the movable rim G said rim is provided with a series of inwardly projecting rounded transverse ribs 3 for coöperation with the cam surfaces of the members 2 in such manner that inter-rotation of the movable rim relatively to the fixed rim will cause all of the cams to wedge under their respective ribs and thus securely bind the movable rim in position. The ribs 3 may be separately formed and attached to the movable rim but they are preferably formed by bending inwardly portions of the material of the movable rim as clearly indicated in Fig. 2.

In order to prevent lateral movement of the rims with respect to each other the cam plates 2 are made of V-shape, being highest at the apex, and the ribs 3 are provided with central lugs 4 which enter between the legs of the V and move toward the apex as the rims are adjusted. The movement toward the apex of course imparts a centering action to the two rims thus making it unnecessary for the operator to exercise any great care in centering the rims when introducing the ribs upon the cam plates.

The lugs are preferably formed by being riveted through the material of the rib as clearly indicated.

The rounded shape of the rib provides only a single point of contact for the rib against each of the legs of the cam so that likelihood of the parts rusting together is avoided. If desired the engaging surfaces of the legs of the cam may be rounded as clearly indicated in Fig. 4 so as to further insure against likelihood of the parts rusting together at any time.

The mechanism for rotating the rims with respect to each other is clearly disclosed in Figs. 2 and 3 and includes a slide 5 arranged preferably beneath the surface of the band 1 and having a lug 6 upon its outer surface slidable in a circumferential slot 7 which is formed in said band. The lug 6 engages within a socket 8 formed in a plate 9 which is rigidly connected to the inner surface of the rim G. The edge surface of the slide 5 is formed with gear teeth 10 arranged to be engaged by the teeth of a pinion 11 which is carried by a shaft 12 rotatably journaled transversely of the fixed rim. One end of the shaft projects from one side of the fixed rim and is squared as at 13, for receiving a suitable handle by means of which the shaft and gear may be rotated at will to move the lug 6, and consequently the rim G, in either direction.

The slide and shaft are preferably carried by a metallic housing 14 which is fitted into a suitable recess cut into the wood of the felly and is held by a cover plate 15 of a size and shape to snugly encircle the felly to reinforce it as will be readily understood. Bolts 16 extend through the plate 15 and through the intermediate portions of the housing so as to hold all of said parts rigid. Other bolts 17 extend through the plate 15 and through portions of the felly beyond the ends of the housing.

The housing is provided with a runway 18 along which the slide 5 is free to move. The walls of this runway are formed with grooves 19 to receive lateral guide ribs 20 formed upon the slide whereby to maintain the slide always in proper coöperative relation. If desired the lug 6 may over-hang, as illustrated, to provide grooves 21 within which projecting guide portions 22 of the housing project to further insure proper movement of the slide at all times.

In order to drive the slide, and consequently the movable rim, forcibly into its farthest tightening position, a wedge 23 is provided, said wedge being movable preferably radially of the wheel within a pocket 24 formed in the housing 14 and being operable upon an inclined or cam end surface 25 of the slide which over-hangs into the pocket 24. The movements of the wedge may be controlled in any suitable manner but are preferably controlled by a screw 26 threaded into the housing 24 behind the wedge. The screw 26 projects outwardly from the housing through a suitable opening in the plate 15 and is squared as at 27, to receive an appropriate tool whereby it may be rotated in either direction. A lock nut 28 is provided upon the screw and a lock washer 29 is arranged between the nut 28 and the adjacent portion of the housing to prevent unintentional rotation of the screw at all times.

The screw has preferably a swivel connection with the wedge, as at 30, whereby the wedge may be forced in either direction by proper rotation of the screw.

In assembling the movable rim upon the fixed rim an operator has simply to slide the movable rim laterally over the fixed rim so that the socket telescopes over the lug 6 and the ribs 3 stand adjacent the lower, or thinner ends, of the wedge plates 2 with the lugs 4 ready to enter the space between the legs of the cam plates. He then rotates the shaft 12 to move the slide and movable rim in a direction to cause all of the ribs 3 to advance toward the higher ends of the cam plates. Having rotated the shaft as far as possible, he then rotates the screw 26 to cause the wedge 23 to move along the inclined end surface 25 of the slide and thus further move the slide with great force to cause the ribs 3 to move farther into tightening relation with the cam plates.

When the screw 26 has been moved outwardly as far as possible and the lock nut 28 has been tightened down the parts are ready for service and it will be impossible for the slide to move backwardly to permit loosening of the ribs 3 until the wedge 23 has been first moved backwardly.

One of the important points of value attained by this invention is that all of the parts thereof are of such a nature that they may be mounted upon the ordinary automobile wheel of present day manufacture, with very little expense and labor. In order to enable this result the housing 14 has its end walls, as 31, made parallel to each other so that the housing may be readily inserted into the recess in the felly from the inner side of the felly without necessity for removal of the fixed band 1. In cases where the felly is of greater thickness than the thickness of the housing, that is between its inner to outer circumferential surfaces, filler blocks 32 may be readily inserted. The wedge plates 2, and the ribs 3 with the lugs 4, and the plate 9, may be readily assembled.

As many changes could be made in this construction without departing from the scope of the invention as defined in the following claims, it is intended that all matter contained in the above description or shown in the accompanying drawings, shall be interpreted as illustrative only and not in a limiting sense.

In the modification Fig. 5 the lug 6 is connected with a threaded sleeve 33 which is mounted upon a screw shaft 34. The shaft 34 carries a worm-gear 35 arranged to be driven by a worm-pinion 36 which stands transversely of the felly. Rotation of the worm 36 by a suitable tool will impart rotation to the screw shaft 34 and a consequent powerful movement of the lug 6. This structure obviates the necessity for a separate locking device since it automatically locks itself in any position, as will be readily understood, and is desirable in some cases.

Having thus described my invention what I claim as new and desire to secure by Letters Patent is:

1. A wheel, a rim therefor adapted to be connected with the wheel by relative rotary movement between the wheel and the rim, a member engaging between the wheel and the rim to rotate the rim relatively to the wheel, and a wedge for engaging said member to force said member in one direction.

2. A wheel, a rim therefor adapted to be connected with the wheel by relative rotary movement between the wheel and the rim, a member carried by one of said parts to slide circumferentially thereof and having a portion to engage the other part to cause said other part to move therewith, means for sliding said member, and mechanism operated independently of said means, for the purpose of locking said member, said mechanism being also of a character to slide said member.

3. A wheel, a rim therefor adapted to be connected with the wheel by relative rotary movement between the wheel and the rim, a member carried by one of said parts to slide circumferentially thereof and having a portion to engage the other part to cause said other part to move therewith, a gear the teeth of which engage teeth upon said member to slide said member by rotation of the gear, and a wedge movable into engagement with a portion of said member to force said member beyond the point to which it may be moved by said gear.

4. A wheel, a member carried by the wheel to slide circumferentially thereof, and having a portion to engage the rim to cause the rim to move around the wheel, means for sliding said member, and auxiliary mechanism, more powerful than said means, for sliding said member still further.

5. A wheel, a member carried by the wheel to slide circumferentially thereof, and having a portion to engage the rim to cause the rim to move around the wheel, means for sliding said member, auxiliary means also for sliding said member, said auxiliary means having greater leverage than said means and also constituting a lock to retain the member slid.

6. A wheel, a member carried by the wheel to slide circumferentially thereof, and having a portion to engage the rim to cause the rim to move around the wheel, means for sliding said member, auxiliary means also for sliding said member, said auxiliary means comprising a wedge slidably engaging said member, a screw for forcing the wedge into engagement with said member, and means for locking the screw against retrogressive rotation.

7. A wheel comprising a felly, a fixed rim therefor, and a movable rim, the felly having a recess formed therein, a housing within said recess, a slide carried by said housing, said slide having a lug projecting through an opening formed in the fixed rim and into engagement with the movable rim, and means carried by the housing for sliding the slide adapted for moving the movable rim into and out of fixed relation with the wheel.

8. A wheel having a fixed rim and a movable rim therefor, said two rims having wedge-acting parts adapted when the movable rim is moved laterally over the fixed rim to assume position for coöperating with each other upon subsequent inter-rotation between said two rims, one of said rims having a lug thereon, the other rim having a part movable into position adjacent the lug when the movable rim is moved laterally over the fixed rim, means for shifting the position of said lug to produce such inter-rotation between the fixed and movable rims as to cause said wedge-acting parts to approach their final positions, and other means for forcibly further shifting said lug to cause said wedge-acting parts to assume their final positions.

9. The combination of a wheel, a rim therefor adapted to be connected with the wheel by a relative rotary movement between the wheel and the rim, a member operatively engaging between the wheel and the rim to rotate the rim relatively to the wheel, a wedge for engaging said member in order to force said member in one direction, a screw for forcing the wedge into engagement with said member, and means for locking the screw against retrogressive rotation.

10. A wheel comprising a felly, a movable rim therefor, the felly having an opening formed entirely therethrough extending radially thereof, a fixed rim upon the felly overlying and partly closing the outer end of said opening, mechanism within said opening confined and held against movement outwardly from said opening by the overlying portion of said fixed rim, said mechanism having a movable portion extending through said fixed rim outwardly therefrom for engaging the movable rim adapted to move the movable rim into and out of fixed relation with the fixed rim, said opening in the felly being of a shape to permit insertion of said mechanism thereinto through the inner surface of the felly, and a cover plate fixed about the felly adjacent said opening to reinforce the felly, and having a part adapted substantially to close the inner end of said opening.

In testimony whereof I affix my signature in the presence of two witnesses.

WADE W. BOWMAN.

Witnesses:
L. GESSFORD HANDY,
MAY SCHULZ.